United States Patent
Boehm et al.

(10) Patent No.: US 7,725,612 B2
(45) Date of Patent: May 25, 2010

(54) METHOD AND SYSTEM FOR PERSONALIZED I/O DEVICE INITIALIZATION

(75) Inventors: Janko Boehm, Ehningen (DE); Herwig Gustav Elfering, Baden-Baden (DE); Thomas Hess, Bad Liebenzell (DE); Daniel Metz, Muggensturm (DE)

(73) Assignee: International Business Machines Corporation, Armonk, NY (US)

( * ) Notice: Subject to any disclaimer, the term of this patent is extended or adjusted under 35 U.S.C. 154(b) by 923 days.

(21) Appl. No.: 11/232,809

(22) Filed: Sep. 22, 2005

(65) Prior Publication Data

US 2006/0015657 A1 Jan. 19, 2006

Related U.S. Application Data

(62) Division of application No. 10/614,965, filed on Jul. 8, 2003, now abandoned.

(30) Foreign Application Priority Data

Jul. 9, 2002 (EP) .................................. 02015239

(51) Int. Cl.
*G06F 3/00* (2006.01)
(52) U.S. Cl. .............................. 710/8; 710/10; 710/11; 710/12; 710/13; 719/321; 719/327

(58) Field of Classification Search ...................... None
See application file for complete search history.

(56) References Cited

U.S. PATENT DOCUMENTS

| | | | |
|---|---|---|---|
| 5,424,589 A | 6/1995 | Dobbelaere et al. | 326/41 |
| 5,646,544 A | 7/1997 | Iadanza | 326/38 |
| 5,760,607 A | 6/1998 | Leeds et al. | 326/38 |
| 6,181,159 B1 | 1/2001 | Rangasayee | 326/39 |
| 6,539,418 B2 | 3/2003 | Schneider et al. | 709/203 |
| 6,973,658 B2* | 12/2005 | Nguyen | 719/327 |
| 7,010,624 B1* | 3/2006 | Zhou et al. | 710/8 |

OTHER PUBLICATIONS

Structured Computer Organization, Second Edition, Andrew S. Tanenbaum, copyright 1984, pp. 10-11.*

* cited by examiner

*Primary Examiner*—Alan Chen
(74) *Attorney, Agent, or Firm*—Cantor Colburn LLP; John Campbell

(57) ABSTRACT

A method for controlling a plurality of I/O devices being attached to a microprocessor by a special number and type of interfaces is provided. A generic configurable chip is connected to the I/O space of said microprocessor, said generic chip comprising a switch matrix being adapted to assign said special number and type of interfaces to each specific device when initializing said device.

17 Claims, 3 Drawing Sheets

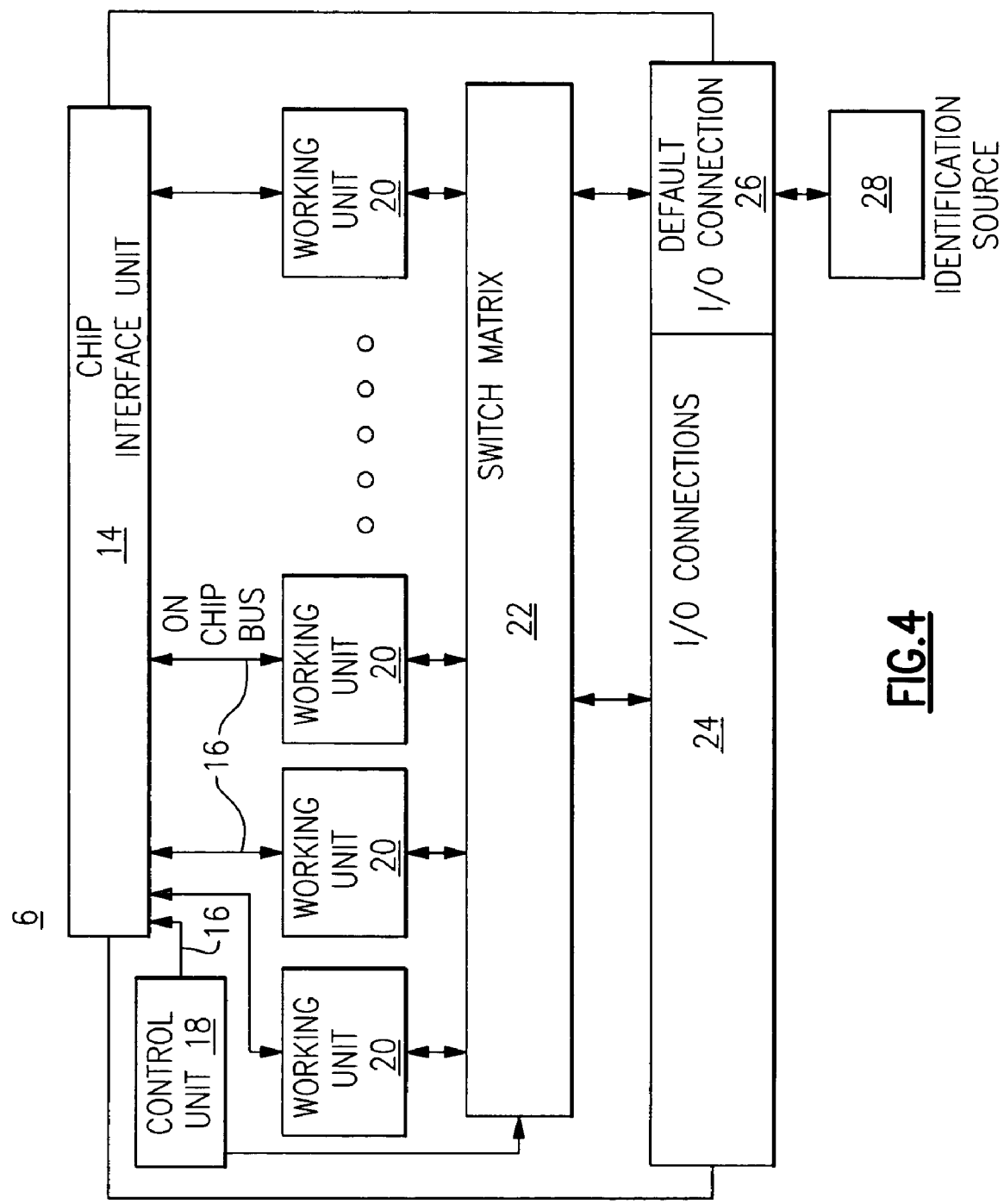

METHOD AND SYSTEM FOR PERSONALIZED I/O DEVICE INITIALIZATION

This application is a division of U.S. patent application Ser. No. 10/614,965 "Method and System for Personalized I/O Device Initialization", Janko Boehm et al., filed Jul. 8, 2003 now abandoned.

BACKGROUND OF THE INVENTION

The present invention relates, in general, to accessing I/O functions. More specifically, the invention relates to accessing a great variance of I/O devices in a control system. Still more specifically, the present invention deals with accessing such I/O functions in embedded control environments.

In embedded control applications it is not always possible to meet all wanted requirements with standard I/O chips. Very often, it is tried to fulfill these requirements with a custom design. This design then will end in realization of a special designed chip, based, e.g., on ASICs. However, typically the I/O connectivity of these chips and not the available space is limiting the integration of more functionality on the same chip.

Though I/O devices may have a high similarity according to their requirements with regard to the I/O protocols supported (e.g., IC bus ($I^2C$), Universal Asynchronous Receiver/Transmitter (UART), General Purpose I/O (GPI/O) and the like), the number of I/O ports is different on each specific device.

In many applications, a certain number and type of I/O devices must be controlled (it is of no importance whether these devices are cards in a computer system, switches or hub-devices in a network or switching units in a luggage or parcel sorting system or similar systems). Typically, this controlling task is done by means of a microcontroller. However, in most cases, the industry does not offer out of the shelf a respective controller with enough or exactly the right I/O interfaces on the core chip. Accordingly, a chip (most probably an ASIC) will have to be developed that can be connected to the I/O space (memory mapped I/O, PCI, CAN-bus, Ethernet, etc.) of the controller as an extender chip. As already mentioned above, this chip would most probably be a custom design and is expanding the number and the type of the controller interfaces in order to exactly offer the right number and type of interfaces as required by the devices to perform their specific tasks. However, even if all of these devices would need the same sort or type of I/O interfaces (such as GPI/O, UART, IIC, and the like), the quantity of the interfaces may be different for each of the different device types to be controlled. The traditional methods to solve this problem would be to a) develop one individual chip (ASIC) for each device type or, b) develop one single chip (ASIC) providing a superset (in number and type) of all the interfaces needed for all the different device types.

The disadvantage of solution a) is obvious as it is clear that developing and producing n (assumed n being the number of different device types that shall be controlled) different chips (ASICs) is much more expensive then doing all this just once for one chip being produced in bigger volumes.

However, using solution b) would not only maximize the number of transistors on the chip, but would at the same time maximize the number of pins. Since industry is able to double the transistor density on a chip about every 18 months, the number of I/O pins is more and more determining the size and at the same time the costs (for each individual chip as well as for the space in the cards) of a chip.

BRIEF SUMMARY OF THE INVENTION

It is therefore an object of the present invention to provide one single chip providing a superset of all the interfaces needed for all the different device types, this chip not being bigger than any individual chip for each device type.

It is a further object of the present invention to provide a method to perform an individual initialization procedure at the time the device gets attached to a system.

It is still a further object of the invention to do this initialization when new hardware is attached to a running system, in computer technique known as hot-plugging.

BRIEF DESCRIPTION OF THE SEVERAL VIEWS OF THE DRAWING

These and other objects will be apparent to one skilled in the art from the following detailed description of the invention taken in conjunction with the accompanying drawings in which:

FIG. 4 schematically shows how the invention is employed on a chip.

DETAILED DESCRIPTION OF THE INVENTION

Figure 1:
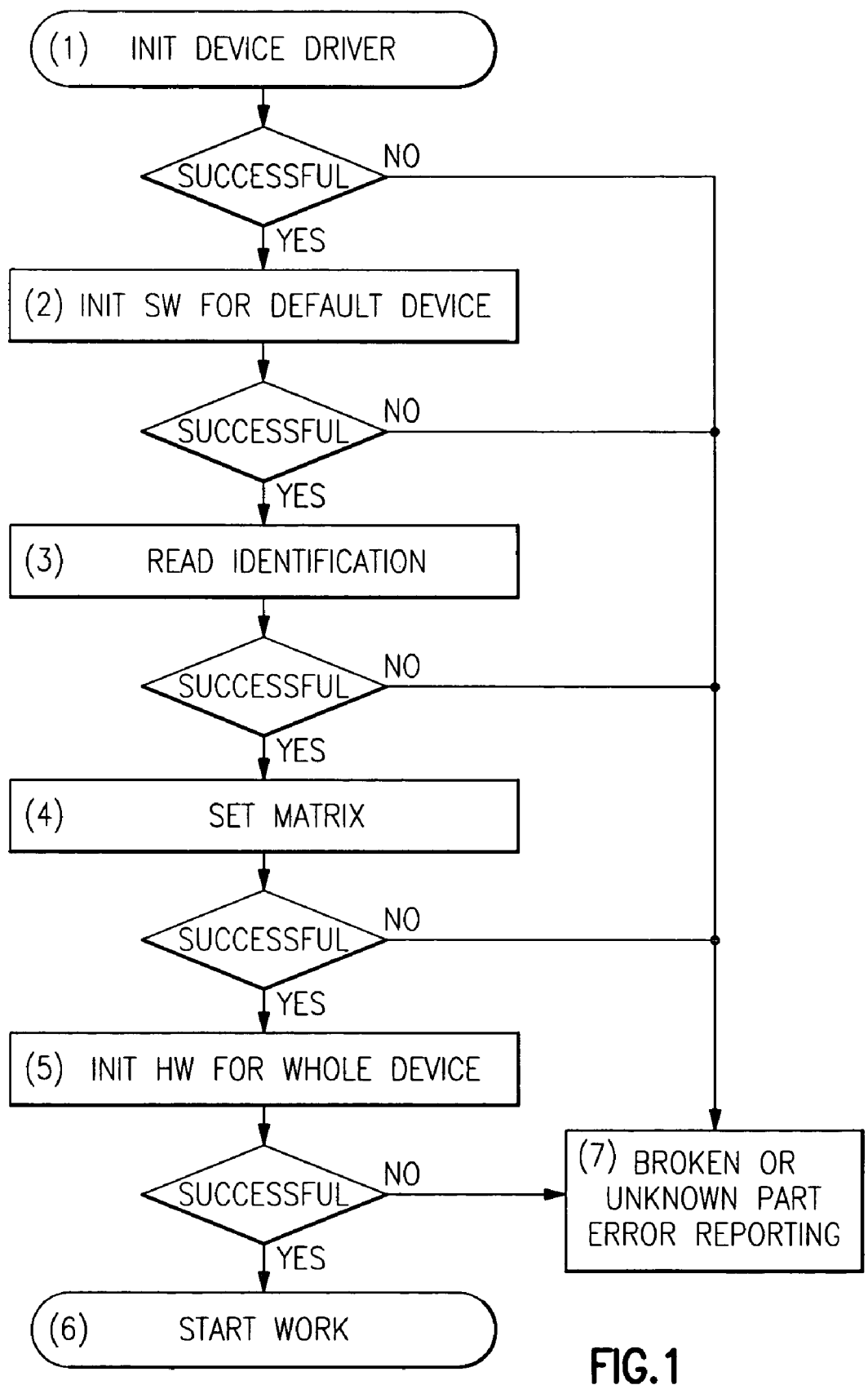
FIG. 1 is a flow-chart indicating the initialization sequence according to the invention.

With the present invention, a flexible way is provided to assign I/O connectivity to different function units on a chip, depending on the functionality needed for the specific field of operation the chip will be employed for. This requires a special initialization step to personalize the hardware according to the special requirements of the specific device during the device driver initialization. To do so allows to build a more generic hardware for a certain variance of I/O devices which could be produced with lower costs in a higher volume.

The following table gives an example for three different devices needing various numbers of the three interface types GPI/O, UART and IIC. It has to be mentioned that the present invention is not restricted to a special number or type of devices or interfaces but can be used with any number and type of devices and interfaces.

| I/O Type | Device Type A # of interfaces | # of pins | Device Type B # of interfaces | # of pins | Device Type C # of interfaces | # of pins | Max # of pins |
|---|---|---|---|---|---|---|---|
| GPI/O | 48 | 48 | 20 | 20 | 60 | 60 | 60 |
| IIC | 10 | 20 | 14 | 28 | 8 | 16 | 28 |
| UART | 30 | 60 | 40 | 80 | 24 | 48 | 80 |
| Sum | | 128 | | 128 | | 124 | 168 |

In case one would develop one individual chip (ASIC) for each device type, three different chips would be needed, each of them not bigger than 128 pins. It has to be mentioned that this is only an academic example where just the functional pins are taken into account. The power supply pins, e.g., are not counted in this example. However, this has no influence on the subject-matter of the invention.

In case one single chip (ASIC) providing a superset (in number and type) of all the interfaces needed for all the different device types is to be developed, this universal chip would need at least 168 (this being the sum of the maximum number of pins for each of the three devices given in the table), if not 196 pins (depending on the granularity of the chips. This, however, would enlarge the chip size by at least 31%.

The present invention solves this problem by providing a universal, generic chip which reduces the number of pins to the highest number of pins of the biggest individual chip, i.e., 128 in the above example. These 128 pins are the maximum of the three individual chips mentioned above. The reduction is achieved by a switch matrix that is assigning the pins according to the needs of the specific device. The assignment of this switch matrix can be done either a) in hardware by the use of ID-bits on the card. These ID-bits would be implemented a select lines preselecting the functions of the chip required in the specific field of operation; or b) by software initialization.

Method a) is inflexible. Depending on the source of identification, e.g., ID-bits which are defined due to specific patterns on default GP-I/O lines, the pins are assigned by the switch matrix to the pin-out appropriate for the device according to the ID. The disadvantage is that, at the point in time when the chip is designed, all IDs and their exact pin assignments will have to be known. The software method b) is more flexible and will therefore be described in the following in more detail.

The main idea is that the controller prior to any control task is setting up the chip (ASIC), according to the device that has to be controlled. The chip may consist either of an active (e.g., a microprocessor design MACROS together with the custom design MACRO on one chip) or an inactive (ASIC, just the custom design on the chip) element. After this set up the chip can be used by the controller software for the intrinsic controlling task in the same way as any traditional device. To do this setup, the software has to identify the chip or the device before the switch matrix can be initialized accordingly. It is proposed that the identification can be done, e.g., by reading the ID-bits, using the default settings of the switch matrix (cf. FIG. 4). To support this, the switch matrix control unit will always force the switch matrix in this state after initial power-on of the chip. The requirement for an identification is not a special additional requirement of the present invention. Whenever the controller controls a number of different devices, a device identification is needed. This is independent for the proposed solution. Therefore, the requirement is not evoked from the present invention.

In the above mentioned example, the identification would be done by data stored in an SEEPROM. The SEEPROM would be connected to the chip by an IIC bus or in any other possible way, e.g., via UART, GPI/O, etc. In this case the default connection of the matrix would always—this especially also means before any initialization—support this default connection to the IIC engine in the chip. The identification could of course also be done in other ways, for example by reading some ID-bits via the GPI/O engine, or by using the UART engine for communication to another chip on the card to get the unambiguous identifier of the device. In both latter cases, of course, the GPI/O respectively the UART engine must be connected to fixed output pins by the default matrix. In any case the initialization sequence would look like in FIG. 1. In the first step (1) the device driver would be initialized so that the device can be accessed at all. Subsequently, the default connection on the device would be initialized (2). In the above example this would be the IIC device to access the identification information. In the next step (3) this information would be read. The code would use this information to set the matrix according to requirements of the identified device. This would be done before in the next step (4) the code would initialize the now known hardware of the entire device and the device driver. If all steps were completed successfully the code now can start using the full functionality of this device (5). If any of the steps 1 to 5 fail, the code would execute (7), report the error and the device would stay uninitialized and can not be used for further work.

The purpose of the invention is the requirement to control a higher number of different card types or the like. These cards may be installed in a computer frame and, according to their type, have different requirements regarding their I/O connectivity, depending on the task that has to be served on the specific card. For all these cards the generic chip is more or less the entrance of control for the embedded controller. For this purpose all these chips are connected with the controller by a proprietary serial interface.

This type of interface and protocol could be replaced by any communication infrastructure (like IIC, UART, Ethernet, USB, PCI— Bus, Firewire, or others), and protocol (like TCP/IP, PPP, etc.), or it could be even attached directly to the memory bus of the controller. Whenever special hardware has to be designed, because the I/O capacity of standard controllers is not sufficient, the present invention is applicable for the control task.

Figure 2:
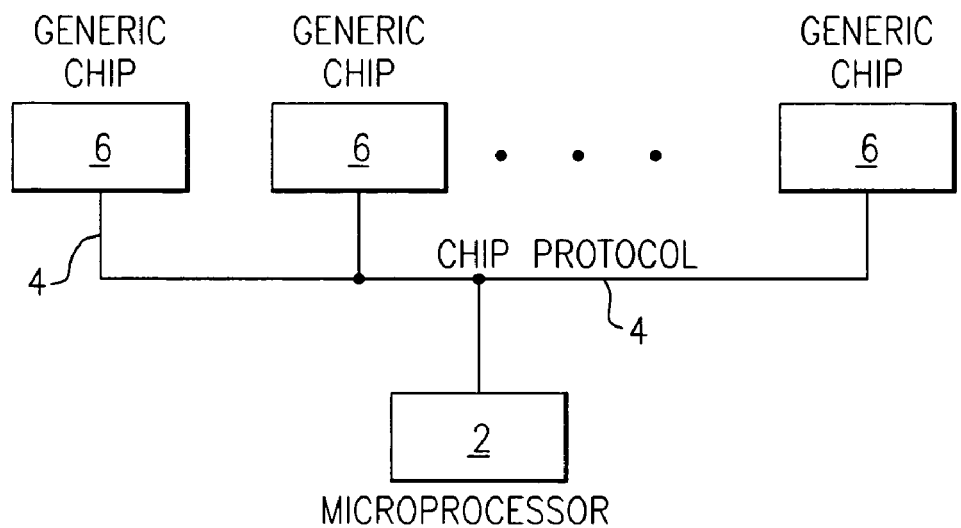
FIG. 2 schematically shows a first embodiment of a control network according to the invention.

Given the present invention, in these cases one generic chip can be used to serve the requirements of all the different devices. Other operational fields could be the control of an assembly belt or for instance a stack of different hubs, switches, or other network devices that shall be controlled by one central point of control. A first way to build such a control network is shown in FIG. 2. Here a centralized microprocessor 2 is talking to the distributed devices (not shown) each having the generic chip 6 according to the invention via a chip protocol 4 like IIC.

Figure 3:
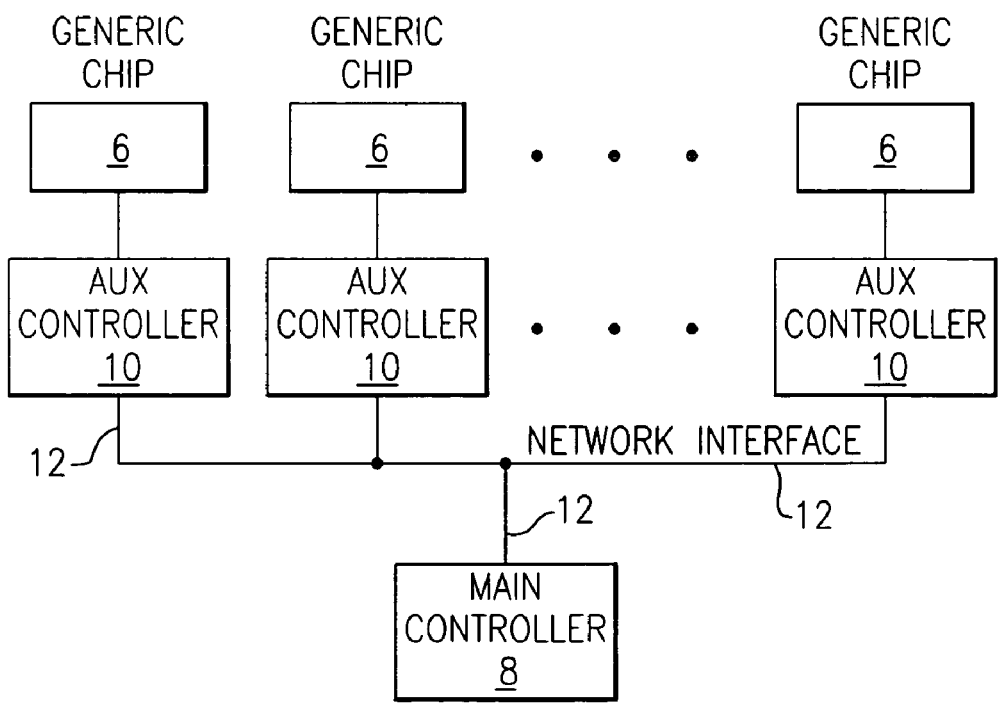
FIG. 3 schematically shows a second embodiment of a control network according to the invention.

The other way would be an arrangement as depicted in FIG. 3, where a main controller 8 is used. This controller 8 is connected to smaller autarchic distributed controllers 10 (auxiliary controller) which talk to each others via Ethernet 12 or any other Network interface. In this case the generic chip according to the invention would be something like an extender chip to the auxiliary controllers to generate the required I/O fan out.

FIG. 4 schematically depicts how the switch matrix is employed on the chip. The matrix itself could be implemented in any state of the art implementation as, e.g., known from crossbar switches used in telecommunication hardware.

On top of FIG. 4, a unit 14 of the chip 6 is depicted, which is building the interface, that is connecting the chip and the controller. This interface can be any type of interface applicable for inter chip connection. In case of a passive implementation of the chip no processing unit is part of interface unit. This means, the protocol connecting the chip with an outer controller needs to be applicable for passive chips (protocols like: IIC and the like. In case of an active implementation of the chip the interface unit would comprise a processing unit. In this case for the communication to the main controller and communication protocol applicable for the communication between processors (e.g. UART, ethernet, and the like) can be used to communicate to the chip. An on-chip bus 16 is used to connect the interface unit 14 with a control unit 18 of the switch matrix and a certain number of working units 20. This working units 20 are used to serve all the different types of interfaces needed of the controlled card (e.g. IIC, UART, GPI/O, JTAG, and the like). The output lines of these working units are connected to the switch matrix 22. This switch matrix is the main hardware requirement for the present invention. It allows to connect the n output lines of the working units 20 to the m pins of the chip via I/O connections 24, where n is (much) bigger than m. The switch matrix control unit allows to assign up to m of the n lines to the m pins. This assignment has to be done in the initialization step. By default, without any special assignment some lines j (j=n−1) of a working unit are connected to the j pins (j=m−k) of a default I/O connection 26. These j pins are connected to, e.g., ID-Bits or any other source of identification 28 (e.g., SEEPROM via IIC bus according to the example). After the initialization the chip can be used to perform any control task for a specific card not needing more then m pins.

The following is a short summary of the different steps of the method according to the present invention.

In the first step the device driver is initialized by the software. This is the start point of the following initialization process. As already mentioned, the software needs a default access path to get the information to identify the device. In the special case this default path is the path to the IIC unit. In this step the software resets and initializes this default path. Via the known and predefined default path, the software reads the identification information. In the present case this information will be read via IIC from the SEEPROM. The software keeps a list of known and supported chips according to the read ID. Depending on the ID, the software then sets the switch matrix. After initialization and configuration of the switch matrix the universal chip works according to the ID found in the SEEPROM content. This means the pins are set up and from now on the software can work on the universal chip like it would do with a specific type of chip.

Depending on the matrix configuration (in our example for device A, B or C) the units of the chip have to be initialized in a specific way. According to the already known ID, the controller can execute the appropriate initialization procedures of the chip units to be able to handle the specific device. In case of success of all earlier steps the chip can now be used by higher software layers.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for configuring a controller capable of supporting a plurality of communication protocols, the method comprising:
   initializing a default device driver;
   initializing configurable signal pins of said controller such that an identification source is capable of being accessed by said default device driver, said configurable signal pins provided by a switch matrix;
   accessing identification information from said identification source via said default device driver;
   responsive to said identification information, setting the configurable signal pins of said controller for the communication protocol of the device identified by said identification information; and
   initializing said controller for working with the device identified by said identification information.

2. The method of claim 1 further comprising selecting from a plurality of working units, a selected working unit corresponding to said identification information, wherein said selected working unit designates a set of configurable signal pins usable with a device identified by the identification information.

3. The method of claim 1 further comprising communicating between said controller and a device connected to said controller, said device identified by the identification information.

4. The method of claim 1 wherein said identification source is accessed by a microprocessor included in said controller.

5. The method of claim 1 wherein the identification information is provided by a SEEPROM connected to a set of configurable signal pins designated by said default device driver.

6. The method of claim 5 wherein said SEEPROM is connected to said controller by one of an IIC bus, a UART, or a GPI/O.

7. A computer program product for configuring a controller capable of supporting a plurality of communication protocols, the computer program product comprising:
   a storage medium readable by a processing circuit and storing instructions for execution by a processing circuit for performing a method comprising the steps of:
   initializing a default device driver;
   initializing configurable signal pins of said controller such that an identification source is capable of being accessed by said default device driver, said configurable signal pins provided by a switch matrix;
   accessing identification information from said identification source via said default device driver;
   responsive to said identification information, setting the configurable signal pins of said controller for the communication protocol of the device identified by said identification information; and
   initializing said controller for working with the device identified by said identification information.

8. The computer program product of claim 7 further comprising selecting from a plurality of working units, a selected working unit corresponding to said identification information, wherein said selected working unit designates a set of configurable signal pins usable with a device identified by the identification information.

9. The computer program product of claim 7 further comprising communicating between said controller and a device connected to said controller, said device identified by the identification information.

10. The computer program product of claim 7 wherein said identification source is accessed by a microprocessor included in said controller.

11. The computer program product of claim 7 wherein the identification information is provided by a SEEPROM connected to a set of configurable signal pins designated by said default device driver.

12. The computer program product of claim 11 wherein said SEEPROM is connected to said controller by one of an IIC bus, a UART, or a GPI/O.

13. A controller system comprising:
   a default device driver;
   configurable signal pins in said controller for connection to an identification source such that said identification source is capable of being accessed by said default device driver, said configurable signal pins provided by a switch matrix;
   said controller system accessing identification information from said identification source via said default device driver;
   said controller system further being responsive to said identification information, for setting the configurable signal pins for the communication protocol of the device identified by said identification information; and said controller further being initializable for working with the device identified by said identification information.

14. The controller system of claim 13 further comprising a plurality of working units, said controller system selecting one of said working units which corresponds to said identification information, wherein said selected working unit designates a set of configurable signal pins usable with a device identified by the identification information.

15. The controller system of claim 13 further comprising a device identified by said identification information and connected to said configurable pins for providing communication between said controller and connected device.

16. The controller system of claim 13 further comprising a microprocessor in said controller system for accessing said identification source.

17. The controller system of claim 13 further comprising a SEEPROM connected to a set of configurable signal pins designated by said default device driver for providing the identification information.

* * * * *